No. 827,289. PATENTED JULY 31, 1906.
R. H. BOWERS.
NUT LOCK.
APPLICATION FILED OCT. 10, 1905.

Witnesses
W. N. Woodson
Jno Robb

Inventor
R. H. Bowers
By
Attorneys

THE NORRIS PETERS CO., WASHINGTON, D. C.

UNITED STATES PATENT OFFICE.

ROBERT H. BOWERS, OF NASHVILLE, TENNESSEE.

NUT-LOCK.

No. 827,289.      Specification of Letters Patent.      Patented July 31, 1906.

Application filed October 10, 1905. Serial No. 282,216.

*To all whom it may concern:*

Be it known that I, ROBERT H. BOWERS, a citizen of the United States, residing at Nashville, in the county of Davidson and State of Tennessee, have invented certain new and useful Improvements in Nut-Locks, of which the following is a specification.

This invention relates to improvements in nut-locks, and more particularly to that type wherein the nut is provided with a flexible spring-pawl which engages with the threaded portion of the bolt to prevent the nut from working loose.

The primary object of this invention is to provide a nut-lock in which the nut is free from all external projections and is for all purposes dust and water proof and which is so simple in construction as to enable it to be economically employed upon all construction-work where a similar device is desirable.

For a full description of the invention and the merits thereof and also to acquire a knowledge of the details of construction of the means for effecting the result reference is to be had to the following description and accompanying drawings, in which—

Figure 1:
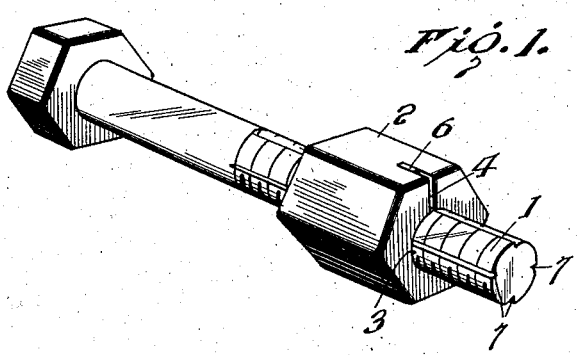
Figure 2:
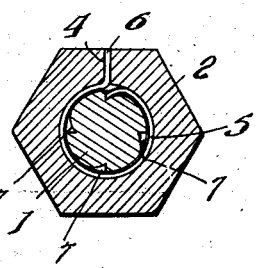
Figure 3:
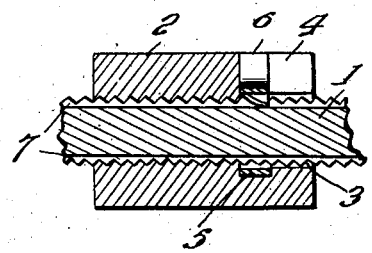
Figure 4:
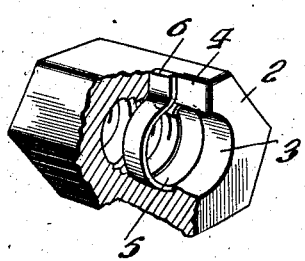
Figure 5:

Figure 1 is a perspective view of a bolt embodying my invention. Fig. 2 is a transverse sectional view through the nut and shows the location of the spring member therein. Fig. 3 is a longitudinal sectional view through the nut. Fig. 4 is a detail perspective view of the nut, parts being broken away. Fig. 5 is a side view of the spring member fitting within the nut.

Corresponding and like parts are referred to in the following description and indicated in all the views of the drawings by the same reference characters.

The numeral 1 designates the threaded portion of a bolt, and 2 is a nut of any suitable type coöperating therewith. The inner portion of the bolt-receiving opening through the nut is threaded for the reception of the bolt, and an annular groove or recess 3 encircles the opening near the outer end thereof. This annular groove 3 has communication with a longitudinal slit 4, located upon one side of the nut and extending from the outer face thereof to the inner edge of the annular groove. An approximately circular spring member 5 lies within this annular groove and has one of its ends 6 bent outward at approximately right angles and fitting in the longitudinal slit 4, while the opposite end projects into the bolt-receiving opening and engages with any one of a series of longitudinal grooves 7 upon the bolt to prevent any backward turning of the nut. It will be observed that the grooves 7 are formed with two faces, one of which is inclined, while the engaging face has an approximately radial direction. The two opposite ends of the spring member 5 are caused to overlap each other a small amount, and this both enables the stress in the spring to be distributed over a large area instead of being concentrated at a point and also renders any accidental displacement of the spring member 5 from the annular groove 3 practically impossible, owing to the fact that it is in engagement therewith throughout its entire length. The end of the spring member 5 which projects into the bolt-receiving opening through the nut and engages with the longitudinal grooves upon the bolt is bent or twisted longitudinally, as best seen in Fig. 5, so that the edge of the spring adjacent the threaded portion of the opening lies close to the base of the annular groove, while the opposite or outer edge extends into the opening. This forms an inclined surface against which the end of the bolt impinges when the nut is screwed into position and prevents the bolt from engaging with the inner edge of the spring member 5 and forcing the latter out of position, as would otherwise be the case.

It will be observed that this nut-lock comprises but three parts—the bolt, the nut, and the spring—and that owing to their peculiar construction they can be readily assembled without the use of screws, pins, or other auxiliary members. Preparatory to the application of the device all that is necessary is to place the spring member 5 in the annular groove 3, and this is readily accomplished by inserting the portion 6 thereof in the longitudinal slit 4 and then compressing the spring member to enable it to pass through the opening in the nut. It will then be understood that when the nut is screwed into position the portion of the spring projecting in the opening will engage with the radial walls of the grooves 7 upon the bolt and render it impossible for the nut to be turned backward.

Special consideration is due the fact that the structure of my invention is of such advantageous character that the strength of the bolt is not in any way reduced and the structure of the nut is such as to render it of ample strength without departing from the usual form or dimensions.

Having thus described my invention, what is claimed as new is—

In a nut-lock the combination of a bolt having a series of longitudinal grooves in its outer face, said grooves being formed with two faces one of which is approximately radial while the opposite face is inclined, a nut coöperating with the bolt, the bolt-receiving opening through the nut having its inner portion threaded while the outer portion is provided with an annular groove, said nut having a longitudinal slit on one side thereof which extends from the outer face of the nut to the inner edge of the annular groove, and a circular spring member fitting within the annular groove and formed with overlapping ends one of which is bent outwardly and fits within the before-mentioned longitudinal slit while the opposite end projects into the opening and engages with the longitudinal grooves upon the bolt, said inwardly-projecting end of the spring being bent or twisted longitudinally for the purpose specified.

In testimony whereof I affix my signature in presence of two witnesses.

ROBERT H. BOWERS.

Witnesses:
   A. B. LACEY,
   J. D. YOAKLEY.